United States Patent
Nobukawa (10) Patent No.: US 9,517,434 B2
(45) Date of Patent: Dec. 13, 2016

(54) CATALYST SYSTEM FOR EXHAUST GAS PURIFICATION UTILIZING BASE METALS, AND CONTROLLING METHOD THEREFOR

(71) Applicant: Takeshi Nobukawa, Toyota (JP)

(72) Inventor: Takeshi Nobukawa, Toyota (JP)

(73) Assignee: TOYOTA JIDOSHA KABUSHIKA KAISHA, Toyota-shi (JP)

( * ) Notice: Subject to any disclaimer, the term of this patent is extended or adjusted under 35 U.S.C. 154(b) by 118 days.

(21) Appl. No.: 14/378,753

(22) PCT Filed: Nov. 9, 2012

(86) PCT No.: PCT/JP2012/079142
§ 371 (c)(1),
(2) Date: Aug. 14, 2014

(87) PCT Pub. No.: WO2013/121636
PCT Pub. Date: Aug. 22, 2013

(65) Prior Publication Data
US 2015/0030507 A1    Jan. 29, 2015

(30) Foreign Application Priority Data
Feb. 15, 2012 (JP) ................. 2012-030401

(51) Int. Cl.
*B01D 50/00* (2006.01)
*B01D 53/56* (2006.01)
*F01N 3/08* (2006.01)
*B01D 53/94* (2006.01)
*B01J 23/72* (2006.01)
*B01J 23/83* (2006.01)
*B01J 23/89* (2006.01)

(52) U.S. Cl.
CPC ......... *B01D 53/565* (2013.01); *B01D 53/9418* (2013.01); *B01D 53/9431* (2013.01);
(Continued)

(58) Field of Classification Search
CPC ............... F01N 2510/0682; B01D 53/9418; B01D 53/565; B01D 2255/904
(Continued)

(56) References Cited

U.S. PATENT DOCUMENTS 7,713,911 B2 * 5/2010 Wakamatsu ......... B01J 23/8913
502/245
2005/0221978 A1   10/2005 Shiratori et al.
(Continued)

FOREIGN PATENT DOCUMENTS

EP    0 723 805 A2   7/1996
EP    0 773 057 A1   5/1997
(Continued)

OTHER PUBLICATIONS

Riccardo Ferrando, et al., "Nanoalloys: From theory to applications of alloy clusters and nanoparticles", Chemical Reviews, vol. 108, No. 3, Mar. 12, 2008, pp. 846-910 and Cover Page.
(Continued)

*Primary Examiner* — Tom P Duong
(74) *Attorney, Agent, or Firm* — Oblon, McClelland, Maier & Neustadt, L.L.P.

(57) ABSTRACT

A catalyst system for exhaust gas purification which comprises a first-stage base metal catalyst located upstream and a second-stage base metal catalyst located downstream, wherein the first-stage base metal catalyst comprises at least one oxide support selected from the group consisting of alumina, ceria, zirconia, yttria, and titania and Cu metal and/or a Cu oxide supported thereon, and in cases where the amount of NOx in the exhaust gas has become or exceeded an NOx criterion, the state of the exhaust gas is switched from slightly rich to rich.

12 Claims, 8 Drawing Sheets (52) U.S. Cl.
CPC .............. *B01J 23/72* (2013.01); *B01J 23/83* (2013.01); *B01J 23/894* (2013.01); *B01J 23/8926* (2013.01); *F01N 3/08* (2013.01); *B01D 2251/2062* (2013.01); *B01D 2255/106* (2013.01); *B01D 2255/2065* (2013.01); *B01D 2255/20738* (2013.01); *B01D 2255/20746* (2013.01); *B01D 2255/20761* (2013.01); *B01D 2255/50* (2013.01); *B01D 2255/65* (2013.01); *B01D 2255/904* (2013.01); *B01D 2257/404* (2013.01); *F01N 2510/0682* (2013.01); *F01N 2560/026* (2013.01)

(58) Field of Classification Search
USPC ........................................ 422/170, 177, 180
See application file for complete search history.

(56) References Cited

U.S. PATENT DOCUMENTS

| | | | | |
|---|---|---|---|---|
| 2008/0085231 | A1* | 4/2008 | Vitse | B01D 53/9409 423/239.1 |
| 2011/0070134 | A1 | 3/2011 | Stakhev et al. | |

FOREIGN PATENT DOCUMENTS

| | | |
|---|---|---|
| EP | 2 233 197 A2 | 9/2010 |
| JP | 5-321651 | 12/1993 |
| JP | 9-173782 | 7/1997 |
| JP | 10-216518 | 8/1998 |
| JP | 2005-288307 A | 10/2005 |
| JP | 2010-229817 | 10/2010 |
| JP | 2011-78968 | 4/2011 |
| JP | 2012-159075 | 8/2012 |
| WO | WO 2012/095728 A1 | 7/2012 |

OTHER PUBLICATIONS

Goutam De, et al., "Two-dimensional Au and Au—Cu alloy nanocrystals with orientation in (111) plane embedded in glassy silica films", J. Phys. Chem. B., vol. 107, No. 49, Nov. 14, 2003, pp. 13597-13600.

International Search Report issued Feb. 12, 2013, in PCT/JP12/079142 filed Nov. 9, 2012.

Liu, et al., "Novel iron titanate catalyst for the selective catalytic reduction of NO with $NH_3$ in the medium temperature range", Communication, Chem. Commun., 2008, pp. 2043-2045.

* cited by examiner

◆SCHEMATIC DIAGRAM OF Cu-SUPPORTING ZEOLITE CATALYST(1)

◆SCHEMATIC DIAGRAM OF Cu-SUPPORTING ZEOLITE CATALYST(2)

CATALYST SYSTEM FOR EXHAUST GAS PURIFICATION UTILIZING BASE METALS, AND CONTROLLING METHOD THEREFOR

TECHNICAL FIELD

The present invention relates to a catalyst system for exhaust gas purification utilizing base metals as catalyst metals, and to a controlling method for the same.

BACKGROUND ART

In recent years, worldwide restrictions on exhaust gas are becoming tighter from the viewpoint of environmental protection. Exhaust gas purification catalysts are being employed in internal combustion engines as one measure. In order to efficiently remove the hydrocarbons (hereunder also abbreviated as "HC"), CO and nitrogen oxides (hereunder also abbreviated as "NOx") in exhaust gas, exhaust gas purification catalysts employ a variety of catalysts, including platinum-group elements such as Pt, Pd and Rh, etc., as catalyst components.

Precious metal catalysts known in the prior art can decompose HC, CO and NOx near stoichiometry, but they are all associated with problems of resource depletion, and there is a demand for catalysts using other metals while exhibiting purification performance at or above that of conventional precious metal catalysts, or purification catalysts that can reduce the usage of precious metals.

PTL 1 describes a method in which nitrogen oxides in exhaust gas are reduced to nitrogen by being passed through a catalyst system comprising at least two catalyst beds in the presence of a reducing agent, wherein the first catalyst bed is iron-beta-zeolite and the second catalyst bed downstream from it is silver supported on alumina.

Reference 2 describes a saddle riding vehicle comprising an internal combustion engine that performs combustion at a lower air/fuel ratio than the theoretical air/fuel ratio, a first catalyst provided in an exhaust channel through which combustion gas is discharged from the internal combustion engine, a second catalyst provided at the downstream end from the first catalyst in the exhaust channel, and a secondary air injector that injects secondary air into a section of the exhaust channel between the first catalyst and the second catalyst, wherein the first catalyst and the second catalyst each contain a precious metal component including at least one of Pt, Rh, Pd and Au, and the first catalyst further contains a zeolite carrier and Co or Fe supported on the zeolite support in greater abundance than the ion-exchangeable amount.

Reference 3 describes an exhaust gas purification device for an internal combustion engine comprising a first catalyst device that is situated in the exhaust channel of an internal combustion engine and purifies noxious components in exhaust gas, a first exhaust concentration sensor situated in the exhaust channel at the upstream end from the first catalyst device, having output characteristics that are approximately proportional to the exhaust gas concentration, operation state detection means that detects the state of operation of the engine, including at least the engine rotational speed and engine load condition, first target air/fuel ratio calculation means that calculates the target air/fuel ratio based on the detection results from the operation state detection means, a second exhaust concentration sensor situated in the exhaust channel at the downstream end from the first catalyst device, in which the output signal is inverted near the target air/fuel ratio, enriching means that sets the target air/fuel ratio to a slightly richer state than the theoretical air/fuel ratio based on the output value of the second exhaust concentration sensor, and control means that accomplishes feedback control of the air/fuel ratio of the gaseous mixture detected by the first exhaust concentration sensor, to the target air/fuel ratio set by the enriching means, wherein a second catalyst device is situated in the exhaust channel at the downstream end from the second exhaust concentration sensor, while secondary air supply means is provided which supplies secondary air into the exhaust channel at the upstream end from the second catalyst device and the downstream end from the second exhaust concentration sensor.

Reference 4 describes a gold alloy catalyst composed of Au and one or more elements selected from among the following metals M, the weight ratio of Au and the metals M being Au/M=1/9 to 9/1, and the Au solid solution content in the alloy being 20 to 80 wt % (M: Pt, Pd, Ag, Cu and Ni (claim 1 of Reference 4)).

CITATION LIST

Patent Literature

[PTL 1] Japanese Unexamined Patent Publication No. 2011-78968
[PTL 2] Japanese Unexamined Patent Publication No. 2010-229817
[PTL 3] Japanese Unexamined Patent Publication HEI No. 05-321651
[PTL 4] Japanese Unexamined Patent Publication No. HEI No. 10-216518

DISCLOSURE OF THE INVENTION

Problems to be Solved by the Invention

However, when it is attempted to use a base metal in a catalyst, since base metals are more easily oxidized than precious metals such as Pt, Pd and Rh, etc., it is necessary to effect enrichment control to lower the oxygen concentration in the exhaust gas, often resulting in impaired fuel efficiency.

In addition, when a reducing agent such as $NH_3$ or urea, etc., is to be used to reduce the nitrogen oxides in exhaust gas, a system that adds a reducing agent such as $NH_3+H_2$, etc., is required and a reducing agent tank, for example, must therefore be mounted as well.

Furthermore, in the prior art wherein NOx is purified with a first-stage catalyst, and air is injected upstream and HC and CO are purified with a second-stage catalyst, with the exhaust gas being controlled at the enriched end, the generation of $N_2O$ prevents the second-stage catalyst from selectively reducing HC and CO, and therefore control to an enriched state has been necessary to purify all of the NOx with the first-stage catalyst and fuel efficiency has been poor. In addition, measures have been necessary for purification of excessively discharged HC and CO. Furthermore, in prior art technologies for injecting air between the first and second-stage catalysts to purify non-combusted HC and CO, injection of air makes it impossible to purify only HC and CO, and therefore the catalyst utilization efficiency has been poor. In the prior art using an alloy of Au and Cu as the first-stage catalyst, NOx purification has been possible in lean conditions but purification performance has been inadequate in slightly enriched conditions.

Means for Solving the Problems

As a result of diligent efforts, the present inventors considered the idea of NOx purification by actively generating $NH_3$ in exhaust gas, and have found that the problems mentioned above can be solved by using a catalyst that can actively generate $NH_3$ as the first-stage catalyst, and employing a controlling method that allows $NH_3$ to be effectively generated while minimizing fuel efficiency reduction.

The present inventors have also found that by creating a momentary enriched state using a catalyst that can actively generate $NH_3$ as the first-stage catalyst and a catalyst that can adsorb $NH_3$ as the second-stage catalyst, it is possible to provide a catalyst that can effectively purify not only $NH_3$ but also HC and CO with the second-stage catalyst even when air is injected, and that has high purification performance for NOx even in slightly enriched conditions, thereby solving the problems mentioned above.

The modes of the present invention are as follows.

(1) A catalyst system for exhaust gas purification comprising a first-stage base metal catalyst located at the upstream end and a second-stage base metal catalyst located at the downstream end, wherein the first-stage base metal catalyst has Cu metal and/or Cu oxide supported on one or more oxide supports selected from the group consisting of alumina, ceria, zirconia, yttria and titania, and when the amount of NOx in the exhaust gas has become equal to or exceeded the NOx criteria, the state of the exhaust gas is switched from slightly enriched to enriched.

(2) A catalyst system for exhaust gas purification according to (1), wherein air is injected between the first-stage base metal catalyst and second-stage base metal catalyst, and the exhaust gas is controlled to a lean condition at the second-stage base metal catalyst.

(3) A catalyst system for exhaust gas purification according to (2), wherein the oxide support of the first-stage base metal catalyst is fine particles of a mixture of alumina, ceria, zirconia and yttria.

(4) A catalyst system for exhaust gas purification according to (3), wherein the first-stage base metal catalyst has an alloy of Au and Cu supported in place of Cu metal and/or Cu oxide.

(5) A catalyst system for exhaust gas purification according to any one of (1) to (4), wherein the second-stage base metal catalyst has one or more metals and/or metal oxides selected from the group consisting of Cu, Fe, Co and Ce supported on one or more oxide supports selected from the group consisting of alumina, zirconia, titania and zeolite.

(6) A catalyst system for exhaust gas purification according to (5), wherein the second-stage base metal catalyst has Cu and/or Fe metal and/or metal oxide supported on an oxide support containing zeolite.

Effect of the Invention

The modes of the invention allow utilization of base metals while allowing purification of NOx at high efficiency. In addition, oxidation performance is drastically increased and the HC purification rate of the second-stage catalyst can be drastically increased.

Furthermore, by using a catalyst that generates $NH_3$ relating to the invention, and improving the controlling method to allow the catalyst to most efficiently generate $NH_3$, it is possible to reduce the enrichment operation time for the entire system and to reduce fuel consumption during control.

In addition, with a catalyst according to one mode of the invention, supporting the $NH_3$ generated by the first-stage catalyst with the second-stage catalyst allows oxidation of HC and CO to be accomplished while achieving selective reduction of $N_2O$ and $NO_R$, which has not been possible in the prior art.

BEST MODE FOR CARRYING OUT THE INVENTION

Throughout the present specification, references using names of the inorganic material compounds or ratios of metals present (instances provided below), which are produced so as to have those compositions, include compositions that when actually produced contain impurities and the like. Thus, a reference using the name of an inorganic material compound or ratio of metals present therein includes, for example, inorganic compounds having in the structure of the inorganic compound a composition with an excess or deficiency of ±1 atoms of elements such as oxygen, hydrogen and nitrogen, etc., in the chemical formula; or in the case of aluminum oxide, for example, $Al_2O_3$ or $TiO_2$ includes compounds $Al_2O_2$ to $Al_2O_4$ or TiO to $TiO_3$ having ±1 oxygen atoms (throughout the present specification, TiO to $TiO_3$ may also be referred to as "TiOx"), as well as those, etc., having hydrogen as an impurity, which are not represented by the compound formula.

Also throughout the present specification:

The terms "NOx criteria", "HC criteria" and "CO criteria" each refer, respectively, to the values of NOx concentration, HC concentration and CO concentration determined from the target regulation values when a vehicle is to conform to exhaust gas regulations.

Unless otherwise specified, and except for the purification rates, the parts, percentage and proportion values are all based on mass.

The concept of supporting will sometimes be expressed as "supported metal, etc."+"/"+"oxide support".

The metals and metal oxides of Cu, Fe and the like relating to the invention may be used in the metallic state, ion state or oxide state on the oxide support.

Throughout the present specification, "particle diameter" refers to the particle diameter measured by powder X-ray diffraction half-power band width measurement and calculated using the crystallite diameter calculation method, unless otherwise specified.

Figure 1:
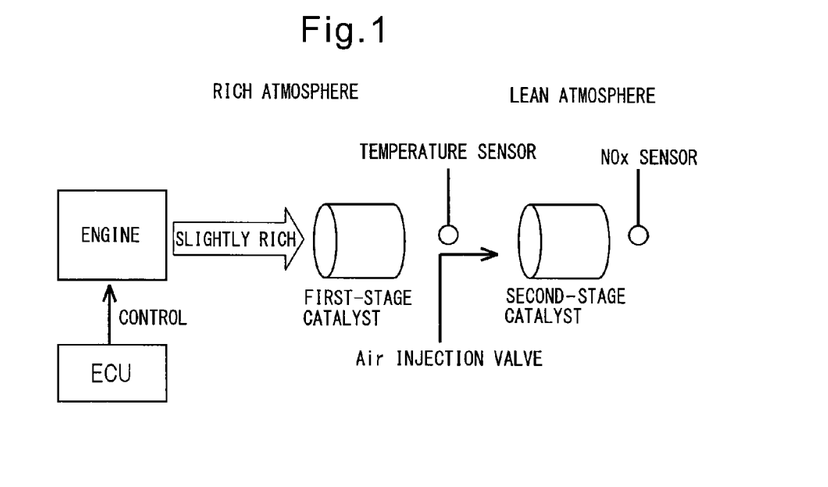
FIG. 1 is a diagram concretely illustrating a catalyst system for exhaust gas purification according to one mode of the invention.

As shown in FIG. 1, the exhaust gas discharged from an internal combustion engine controlled by an engine control unit (ECU) passes through the first-stage catalyst at the upstream end and then through the second-stage catalyst at the downstream end. The catalyst system relating to the invention comprises a temperature sensor and an air injection valve between the first-stage catalyst and the second-stage catalyst, and also comprises a NOx sensor at the downstream end from the second-stage catalyst.

With the exhaust gas purification catalyst relating to the invention, where the first-stage catalyst is a catalyst that easily generates $NH_3$ under enriched conditions, $NH_3$ generated during enrichment control is effectively utilized to increase the purification rate of the catalyst system for exhaust gas purification.

In the controlling method relating to the invention, as shown in FIG. 1, the exhaust gas is controlled to richness below the theoretical air/fuel ratio of A/F=14.6 (stoichiometry) at the first-stage catalyst, and the exhaust gas is controlled to leanness above the theoretical air/fuel ratio at the second-stage catalyst.

Figure 2:
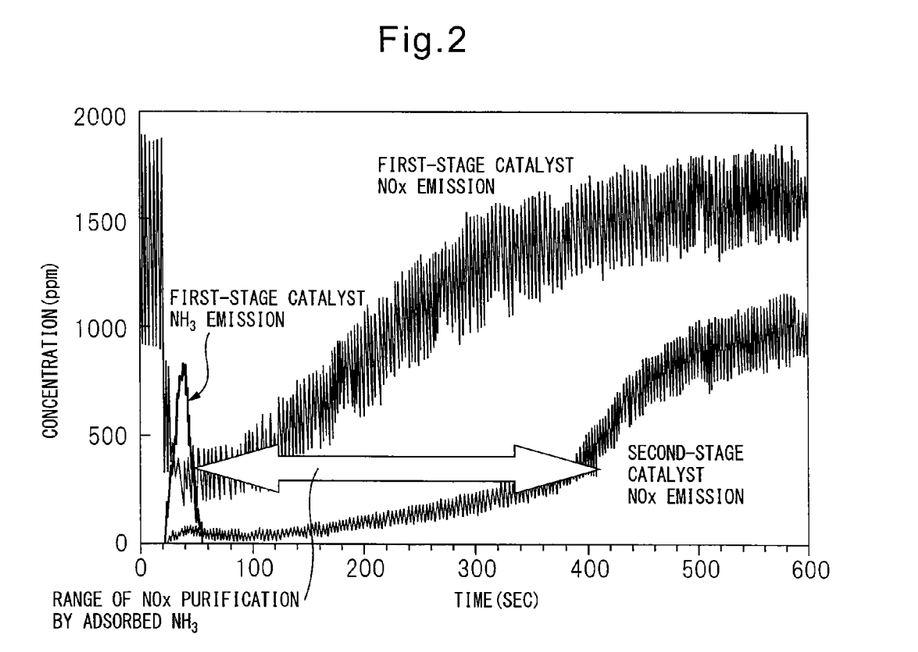
FIG. 2 is a graph concretely illustrating the condition of exhaust gas that has passed through a first-stage catalyst and a second-stage catalyst according to one mode of the invention.

Not only does controlling the exhaust gas to richness at the first-stage catalyst accelerate generation of $NH_3$ by the first-stage catalyst and make it possible to accomplish reduction of NOx by $NH_3$ at the second-stage catalyst, but also controlling the exhaust gas to leanness at the second-stage catalyst can promote reduction of NOx at the second-stage catalyst, and as shown in FIG. 2 for example, the NOx content at the second-stage catalyst outlet can be drastically reduced. Also, the second-stage catalyst can accomplish control to leanness by injection of air between the first-stage catalyst and second-stage catalyst.

The lean state of exhaust gas at the second-stage catalyst is an A/F ratio exceeding about 14.60, and it may be, for example, about 15, about 20 or about 27.

Furthermore, in order to control the exhaust gas from a slightly enriched state to an enriched state and more efficiently generate $NH_3$ when the NOx content reaches at or above a prescribed level, and to increase fuel efficiency while controlling to a more deeply enriched state, the controlling method relating to the invention detects the NOx concentration at the outlet of the second-stage catalyst and shifts the control center A/F ratio toward stoichiometry even in the enriched state, to control the enrichment frequency.

Figure 3:
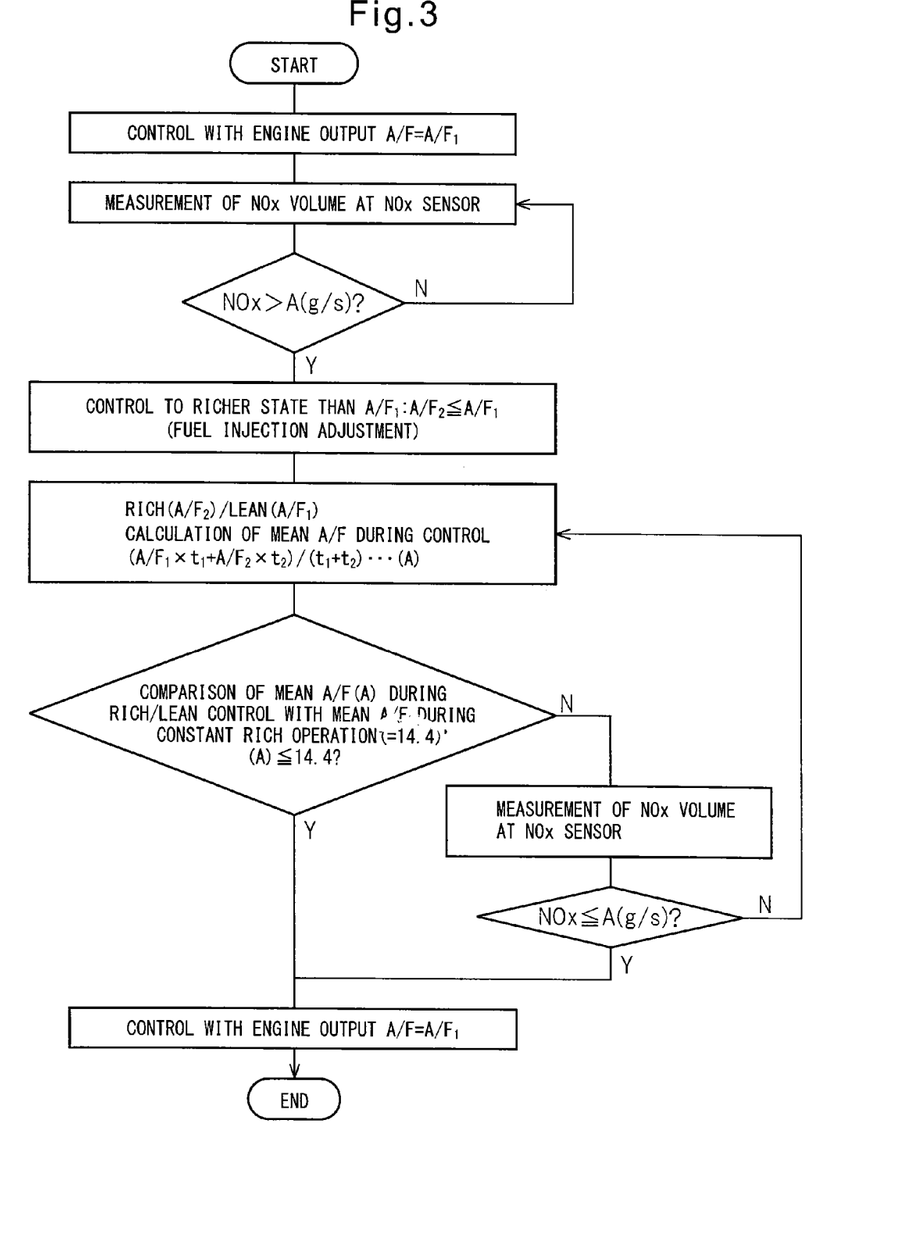
FIG. 3 is a diagram concretely illustrating control flow in a catalyst system for exhaust gas purification according to one mode of the invention.

The controlling method relating to the invention will now be explained in greater detail referring to FIGS. 3 to 5.

Step 1-1: Exhaust gas from an engine is controlled at a first-stage catalyst to a slightly enriched $A/F_1$ ratio such as 14.55, as the preset state.

Step 1-2: Calculation is performed from the output from a NOx sensor set downstream from a second-stage catalyst, the A/F value and the introduced gas volume, and when the NOx concentration read from the MAP of the ECU is higher than a prescribed value A (g/s) indicated by the NOx criteria in FIG. 4, such as 0.5 (mg/s), the A/F value of the exhaust gas is controlled to $A/F_2$ which is richer than $A/F_1$, by adjusting the amount of fuel injection. By enrichment of the exhaust gas, NOx is reduced to $N_2$ and $NH_3$ at the first-stage catalyst which purifies NOx, and is emitted, thereby lowering the NOx gas concentration (FIG. 4).

Figure 4:
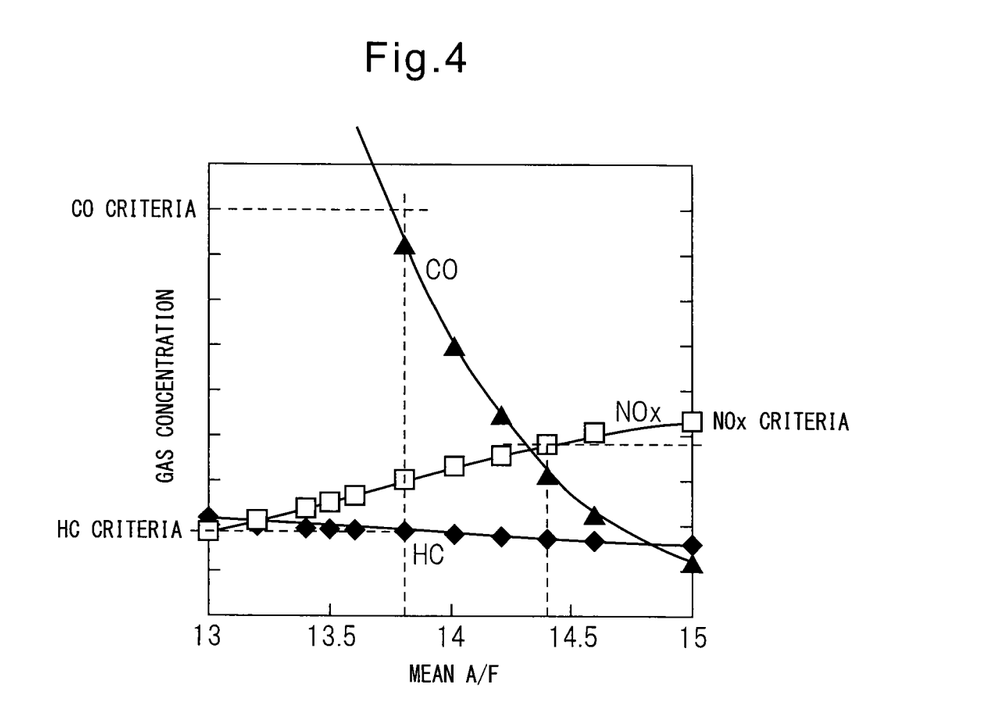
FIG. 4 is a graph showing the relationship between NOx, HC and CO gas concentration and average A/F in exhaust gas, for control flow in a catalyst system for exhaust gas purification according to one mode of the invention.
Figure 5:
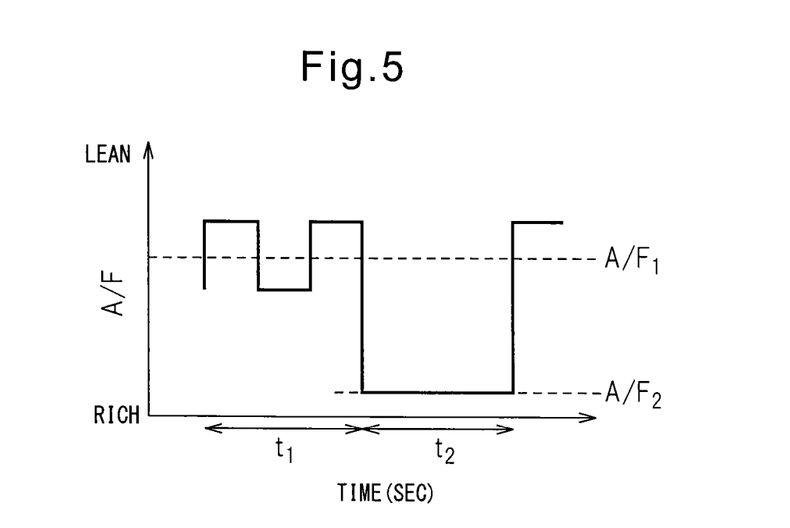
FIG. 5 is a schematic diagram showing the relationship between time $t_1$, $t_2$ and A/F value, for control flow in a catalyst system for exhaust gas purification according to one mode of the invention.

Greater control of enrichment of the exhaust gas results in generation of $NH_3$ with greater efficiency by the first-stage catalyst, but on the other hand the fuel efficiency is impaired and release of CO and HC from the first-stage catalyst is increased, exceeding the CO criteria and HC criteria shown in FIG. 4.

Step 1-3: The controlling method relating to the invention then calculates at term $t_1$ for $A/F_1$ and at term $t_2$ for $A/F_2$ shown in FIG. 5 and calculates the mean A/F value by the formula:

$$\text{Mean } A/F \text{ value} = (A/F_1 \times t_1 + A/F_2 \times t_2)/(t_1 + t_2) \quad \text{formula (A)},$$

the mean A/F obtained from formula (A) is compared with the constant value 14.4, and when the mean A/F from formula (A) is 14.4, the A/F outputted from the engine is controlled to $A/F_1$ and flow is returned to step 1-1.

Step 1-4: When the mean A/F obtained from formula (A) is >14.4, the amount of NOx is measured at the NOx sensor, and when the NOx amount is ≤A(g/s), the A/F outputted from the engine is controlled to $A/F_1$, and flow is returned to step 1-1.

Step 1-5: When the mean A/F obtained from formula (A) is >14.4 and the NOx amount is >A (g/s), step 1-3 and step 1-4 are repeated.

The controlling method relating to the invention minimizes fuel consumption by increasing the amount of $NH_3$ generation and controlling the mean A/F value to a value greater than a prescribed value, such as about 14.4 in order to avoid worsening HC and CO emissions, based on the algorithm indicated above.

In these steps, the $A/F_1$ ratio as the slightly enriched state may be about 14.41 or more, about 14.43 or more, about 14.45 or more, about 14.47 or more or about 14.50 or more, and about 14.59 or less, about 14.57 or less, about 14.55 or less or about 14.53 or less.

The $A/F_2$ ratio as the enriched state may be about 13.50 or more, about 13.55 or more, about 13.60 or more, about 13.65 or more, about 13.70 or more, about 13.75 or more, about 13.80 or more, about 13.85 or more or about 13.90 or more, and about 14.45 or less, about 14.40 or less, about 14.35 or less, about 14.30 or less, about 14.25 or less or about 14.20 or less.

From the viewpoint of increasing the amount of $NH_3$ generation and maintaining satisfactory HC emission, the $A/F_1$ ratio is preferably between about 14.4 and about 14.6, and more preferably between about 14.45 and about 14.55, and the $A/F_2$ ratio is preferably between about 13.8 and about 14.4 and more preferably between about 13.9 and about 14.2.

The first-stage catalyst relating to the invention is a catalyst that can generate $NH_3$ under enriched conditions.

Specifically, there being no particular restrictions so long as the oxide support can be produced, the oxide support used may be one comprising one or more fine particles of alumina, ceria, zirconia, yttria and titania, such as a mixture of alumina, ceria, zirconia and yttria (that is, a mixture of alumina ($Al_2O_3$), ceria ($CeO_2$), zirconia ($ZrO_2$) and yttria ($Y_2O_3$)), a mixture of zirconia ($ZrO_2$), titania ($TiO_2$), alumina ($Al_2O_3$) and zirconia ($ZrO_2$), a mixture of alumina ($Al_2O_3$) and ceria ($CeO_2$), a mixture of alumina ($Al_2O_3$), ceria ($CeO_2$) and zirconia ($ZrO_2$), or a mixture of zirconia ($ZrO_2$) and titania ($TiO_2$), or the like. In the case of a mixture, the ratio of the oxides is not particularly restricted so long as the mixture is uniform, and it may be selected as desired according to the properties to be obtained, etc.

Figure 6:
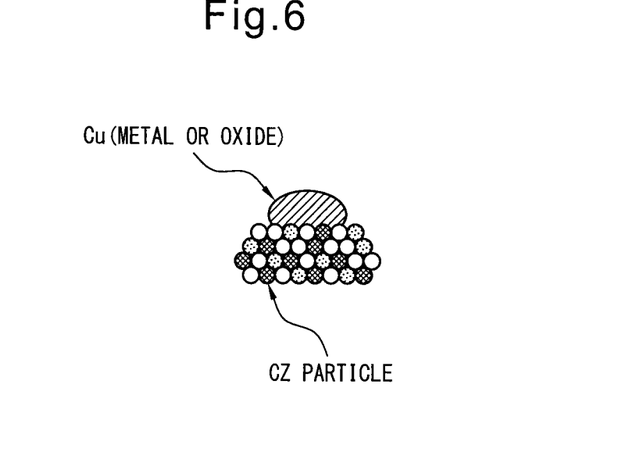
FIG. 6 is a schematic diagram of a mixed catalyst comprising Cu-supporting alumina, ceria, zirconia and yttria according to one mode of the invention.

The crystallite diameter for ceria-zirconia (also abbreviated as CZ diameter throughout the present specification) may be about 3 nm or more, about 4 nm or more, about 5 nm or more or about 6 nm or more, and about 15 nm or less, about 14 nm or less, about 13 nm or less, about 12 nm or less, about 11 nm or less and about 10 nm or less, as the particle diameter measured by X-ray diffraction. It is preferably between 5 nm and 10 nm since this will allow each of the oxides to form finely blended secondary particles and increase the amount of $NH_3$ generation (FIG. 6).

Also, the first-stage catalyst according to one mode of the invention employs Cu metal and/or a Cu oxide as the active species supported on the oxide support.

While it is not our intention to be constrained by theory, it is believed that the $NH_3$-forming sites are the interfaces between the zirconia and/or ceria and Cu metal and/or Cu oxide.

Figure 7:
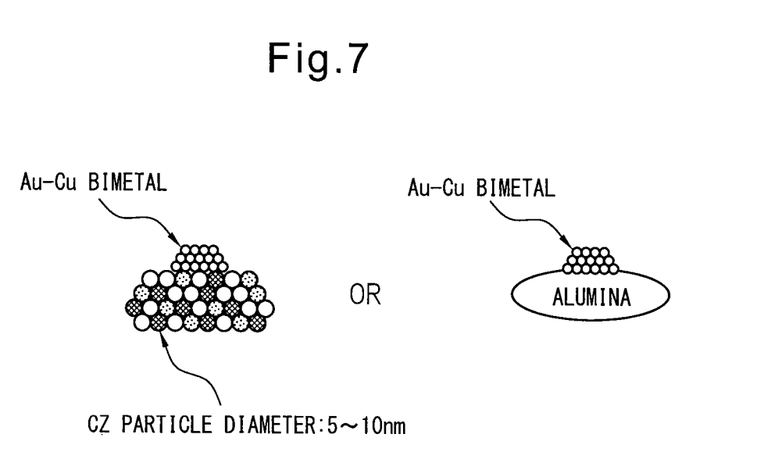
FIG. 7 is a schematic diagram of a catalyst having an alloy of Au and Cu supported on particles, etc., of alumina, ceria, zirconia and yttria, according to one mode of the invention.

According to one mode of the invention, the first-stage catalyst as the base metal catalyst may support Cu metal and Au metal, and/or an alloy of Cu and Au, instead of Cu metal and/or a Cu oxide. For more efficient generation of $NH_3$, the base metal of the first-stage catalyst is preferably an alloy of Cu and Au, and more preferably the oxide support is a mixture of alumina, ceria, zirconia and yttria (FIG. 7).

The loading weight of the Cu metal and/or Cu oxide may be about 0.5 wt % or more, about 1 wt % or more, about 1.5 wt % or more or about 2 wt % or more, and about 10 wt % or less, about 9 wt % or less, about 8 wt % or less, about 7 wt % or less, about 6 wt % or less or about 5 wt % or less, with respect to the oxide support.

It is preferably about 2 wt % or more and about 5 wt % or less, to produce a sufficient number of active sites and allow the Cu to effectively function without aggregation.

The particle diameter of the Cu metal and/or Cu oxide to be supported is not particularly restricted, but may be about 2 nm or more, about 3 nm or more, about 4 nm or more or about 5 nm or more, and about 70 nm or less, about 60 nm or less, about 50 nm or less, about 40 nm or less, about 30 nm or less, about 20 nm or less, about 15 nm or less or about 10 nm or less. FIG. 6 shows particles of about 60 nm as an example.

Even when the first-stage catalyst as a base metal catalyst supports Cu metal and Au metal and/or an alloy of Cu and Au instead of Cu metal and/or a Cu oxide, the loading weight with respect to the oxide support can be considered to be the aforementioned value for the Cu metal and/or Cu oxide, and in order to generate sufficient active sites and allow effective functioning without aggregation between the particles of the Au metal, Cu metal and alloy of Au and Cu, it is preferably about 2 wt % or more and about 5 wt % or less, while the particle diameters of Au metal and Cu metal and Au and Cu alloy may also be considered to be the values mentioned for the Cu metal and/or Cu oxide.

When the first-stage catalyst as the base metal catalyst supports Cu metal and Au metal, and/or an alloy of Cu and Au instead of Cu metal and/or a Cu oxide, the Cu/Au ratio may be 75/25 or more or 90/10 or more and 97/3 or less, and preferably 90/10 or more and 97/3 or less, as the mass ratio.

The crystallite diameter of the oxide support is preferably about 5 nm or more and about 10 nm or less, as avoiding an excessively small diameter will lower the proportion of copper supported on alumina and increase the frequency of contact between ceria and zirconia thus resulting in higher activity, and avoiding an excessively large diameter will minimize growth of Cu particles by interaction between Cu and ceria and will increase the surface area of ceria and zirconia on which the copper is supported, thereby increasing the activity.

Thus, even when the oxide support is alumina, the crystallite diameter of the alumina can be considered to be the value mentioned for the crystallite diameter of ceria-zirconia, and it is preferably 5 nm or more and 10 nm or less for increased activity (FIG. 7).

The second-stage base metal catalyst relating to the invention is a catalyst that can adsorb $NH_3$ generated by the first-stage catalyst and that can react with NOx. While it is not our intention to be constrained by any particular theory, it is possible to consider that having active sites with excellent $NH_3$ adsorption allows the $NH_3$ generated by the first-stage base metal catalyst to be maintained in a greater amount during enrichment control.

Specifically, one or more from among alumina, zirconia, titania and zeolite may be used as the oxide support. In the case of a mixture, the ratio of the oxides is not particularly restricted so long as the mixture is uniform, and it may be selected as desired according to the properties to be obtained, etc.

The second-stage base metal catalyst relating to the invention has one or more from among Cu, Fe, Co and Ce metal and/or oxides supported on an oxide support.

In order to allow a sufficient number of active sites to be produced, the oxide support and the metal and/or metal oxide to be supported are preferably mixed on the nanolevel with particle diameters of about 1 nm or more and about 50 nm or less, and preferably about 2 nm or more and about 10 nm or less (FIG. 7).

The amount of the Cu, Fe, Co or Ce to be supported with respect to the oxide support is not particularly restricted, but it may be about 0.1 wt % or more, about 0.2 wt % or more, about 0.3 wt % or more, about 0.4 wt % or more, about 0.5 wt % or more or about 0.6 wt % or more, and about 10 wt % or less, about 9 wt % or less, about 8 wt % or less, about 7 wt % or less, about 6 wt % or less, about 5 wt % or less or about 4 wt % or less, in terms of the amount of metal. It is preferably about 0.5 wt % or more and about 5 wt % or less, in order to produce a sufficient number of active sites and allow the metal and/or oxide to effectively function without aggregation.

The particle diameter of the Cu, Fe, Co or Ce metal or oxide to be supported is not particularly restricted, but may be about 2 nm or more, about 3 nm or more, about 4 nm or more or about 5 nm or more, and about 70 nm or less, about 60 nm or less, about 50 nm or less, about 40 nm or less, about 30 nm or less, about 20 nm or less, about 15 nm or less or about 10 nm or less.

There are no particular restrictions on the method of producing the mixture of alumina, ceria, zirconia and yttria and the oxide support of alumina, zeolite, or the like to be used for the first-stage catalyst and second-stage catalyst, and known methods such as coprecipitation and the citric acid method, etc., may be employed. For example, for synthesis of a mixture of alumina, ceria, zirconia and yttria by coprecipitation, there may be employed a method of dissolving an Al-containing compound, Ce-containing compound, Zr-containing compound and Y-containing compound in the desired molar ratio and spray atomizing the solution in ammonia water, and adjusting the pH while forming a precipitate, rinsing with ion-exchanged water and drying at for example, about 80° C. or higher and about 120° C. or lower, and then firing at about 500° C. or higher and about 1200° C. or lower for about 2 hours or longer.

The solvent used for the mixed solution comprising the Al-containing compound, Ce-containing compound, Zr-containing compound and Y-containing compound, etc., may be any solvent that is capable of dissolving these compounds, and for example, an aqueous solvent such as water, etc., or an organic solvent, etc., may be used.

Also, if necessary, the oxide support used may be one having a slurry dissolving the fired oxide coated on a commercially available ceramic base. The form of the base is not particularly restricted, and it may be metal honeycomb-shaped or cell-shaped, etc., depending on the purpose of use.

The first-stage catalyst relating to the invention can be produced by loading Cu metal and/or a Cu oxide, or Cu metal and Au metal and/or an alloy of Cu and Au, on a fired oxide support comprising a mixture of alumina, ceria, zirconia and yttria, or alumina, zirconia or the like, and the second-stage catalyst can be produced by further loading at least one type of metal and/or metal oxide to be supported, selected from among Cu, Fe, Co and Ce, on the fired oxide support of alumina, zirconia, titania, zeolite or the like. The form of the support is not particularly restricted, and it is sufficient if the metal and/or metal oxide is supported on the fired body in a generally uniform manner.

The method used to load the metal and/or metal oxide to be supported on the fired oxide support comprising a mixture of alumina, ceria, zirconia and yttria, or alumina, zeolite, or the like, may be a common method such as ion-exchange, impregnation loading, chemical vapor deposition or the like, without any particular restrictions so long as it does not adversely affect the physical properties, etc., of the fired body of the mixture of alumina, ceria, zirconia and yttria or alumina, zeolite, or the like. If necessary, an oxide support already supporting the metal and/or metal oxide may be used directly, or it may be formed into a slurry and coated onto a base and fired, etc.

When zeolite is to be used for the second-stage catalyst, a BEA or MFI type (manufacturer: Tosoh Corp.) may be used, but SAPO-34 is preferred for excellent heat resistance.

Also, when zeolite is to be used in the second-stage catalyst, it is preferred to use one with a CHA type.

Figure 8:
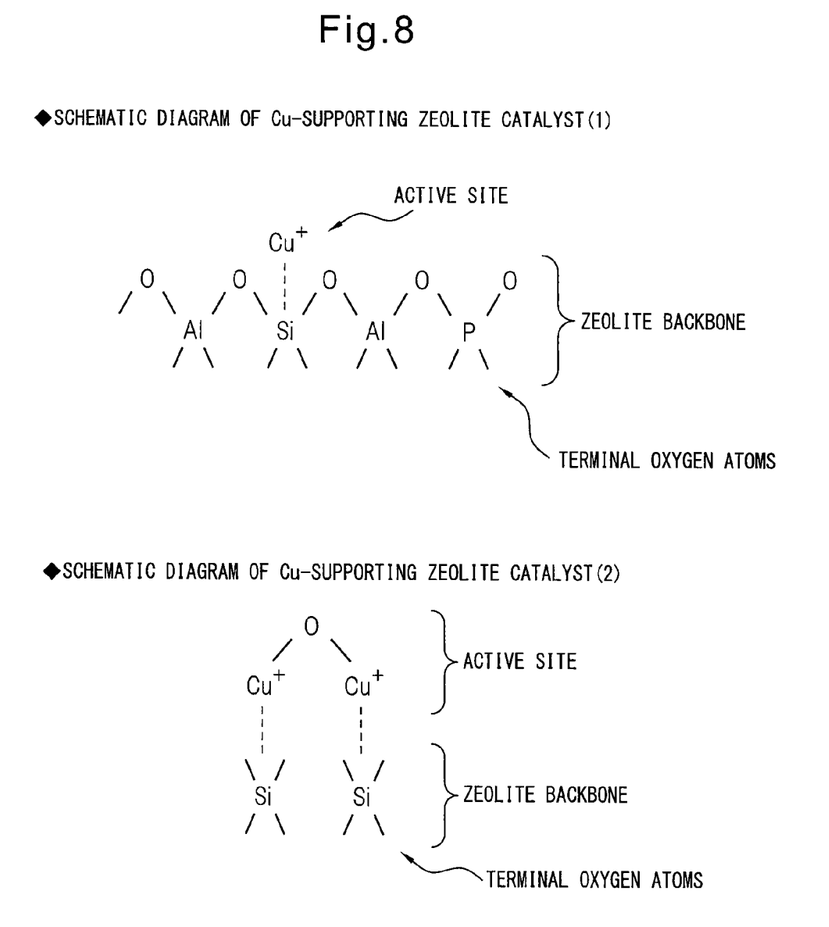
FIG. 8 is a pair of diagrams schematically showing a Cu-supporting zeolite catalyst according to one mode of the invention.

While it is not our desire to be constrained by any particular theory, it is believed that Cu, Fe and the like in the second-stage catalyst are held in an ion state, and for example, Cu, etc., in the ion state acts on oxygen, etc (FIG. 8(1), (2)). Thus, since it is presumably necessary to leave acid sites for adsorption of ammonia, the amount of ion-exchange per zeolite acid sites is desirably 80 wt % or less.

EXAMPLES

The invention will now be explained in more specific detail by examples, with the understanding that the invention is in no way limited to the examples.
(Synthesis of Catalyst)
<Production of Powder of Alumina, Ceria, Zirconia and Yttria Mixture>

Synthesis was carried out by inverse coprecipitation. A 0.5 M ammonia water solution was prepared and 1 L was separated off into a beaker. There were then weighed out 121.9 g of aluminum(III) nitrate nonahydrate, 35.64 g of cerium ammonium(IV) nitrate, 26.73 g or zirconium(IV) oxynitrate dihydrate and 3.83 g of yttrium nitrate hexahydrate, and these were dissolved in ion-exchanged water, after which the volume was adjusted upward to 1 L.

The starting solution was spray atomized into ammonia water at a rate of 60 (g/min) while stirring, and a precipitate was produced.

Here, synthesis was carried out while adding a suitable amount of $NH_3$ water so that the pH did not fall below 9.0.

The synthesized slurry was subjected to centrifugal separation, rinsed with ion-exchanged water and dried at 120° C., and then fired at 500° C. for 2 hours to obtain a powder of the alumina, ceria, zirconia and yttria mixture.

The composition of the obtained powder of the alumina, ceria, zirconia and yttria mixture was $Al_2O_3:CeO_2:ZrO_2:Y_2O_3$ (also abbreviated as A:C:Z:Y throughout the present specification)=65:13:20:2 wt % (as oxides. Hereunder, the oxide support compositions are listed as oxides.), and the CZ particle diameter was 5 nm as measured by X-ray diffraction using an X-ray diffractometer (manufacturer: Rigaku Corp., Model name: RINT-TTR).
<Synthesis of Au/Cu Alloy Particles>

After placing 135 ml of tetraethylene glycol in a 300 ml beaker, it was heated to about 80° C. and 7.5 g of polyvinylpyrrolidone (k-25, product of Wako Pure Chemical Industries, Ltd.) was added and completely dissolved therein. Next, 1.22 g of anhydrous copper acetate was added and the mixture was stirred to complete dissolution, and then the solution was cooled to 10° C. or lower in an ice water bath.

A prescribed amount of a chlorauric acid solution was measured out into a 100 ml beaker, 45 ml of tetraethylene glycol was added and dissolved therein and the resulting solution was added to the solution containing anhydrous copper acetate.

This was cooled in an ice water bath while adding 8 ml of a 1N sodium hydroxide aqueous solution to adjust the pH to between 9 and 10, and the mixture was transferred to a separable flask.

After bubbling for 10 minutes with nitrogen while stirring at room temperature, a solution of 1 g sodium borohydride in 45 ml of tetraethylene glycol was slowly added and the mixture was stirred at room temperature for 30 minutes, after which it was stirred for 1 hour in an oil bath while raising the oil bath temperature to 150° C., and then cooled to room temperature.

The solution was transferred to a 5 L beaker and diluted 10-fold with acetone, and after centrifugal separation at 3000 rpm for 10 minutes, the resulting precipitate was re-dispersed in approximately 80 ml of ethanol.

To this there was added 10.45 g of a powder of a mixture of alumina, ceria, zirconia and yttria for a metal component mass of 5 wt %, and the mixture was evaporated to dryness, further dried at 120° C. and fired at 300° C. for 30 hours.

<Preparation of Powder of Mixture of Alumina, Ceria, Zirconia and Yttria Supporting Au/Cu Alloy Particles>

The alloy particles synthesized in <Synthesis of Au/Cu alloy particles> and the oxide powder synthesized in <Production of powder of alumina, ceria, zirconia and yttria mixture> were used for preparation by impregnation loading. The loaded powder was made to have the loading weight of the Au and Cu alloy particles being 5 wt %, and it was dried overnight at 120° C. and then fired in a degreasing furnace at 300° C. for 30 hours and then fired at 500° C. for 2 hours.

<Production of First-Stage Catalyst>

Step 2-1: Powder of a mixture of alumina, ceria, zirconia and yttria at 137 parts by mass and a binder (manufacturer: Nissan Chemical Industries, Ltd., Model No. AS200) at 13 parts by mass (as solid content) were prepared as a slurry in water at 150 g/liter.

Step 2-2: A ceramic base (manufacturer: NGK Insulators, Ltd., cell shape: quadrilateral/4 mil/400 cells) was coated with the slurry obtained in step 2-1.

Step 2-3: The moisture absorption of the coated catalyst obtained in step 2-2 was measured, and copper(II) nitrate trihydrate was dissolved in an absorbable amount of water so that the Cu concentration was 0.118 mol/liter (corresponding to loading of 5.0 wt % in terms of Cu metal), for absorption loading.

Step 2-4: Drying was performed for 20 minutes with a microwave drier at 120° C. with ventilation.

Step 2-5: Firing was carried out for 2 hours in an electric furnace at 250° C., and the Cu-supporting mixed catalyst of alumina, ceria, zirconia and yttria obtained by decomposing the nitrates was used as the first-stage catalyst for Example 1.

<Production of Second-Stage Catalyst>

Step 3-1: Zeolite powder supporting 167 parts by mass of Cu (manufacturer: Mitsubishi Plastics, Inc.), 20 parts by mass of alumina powder (manufacturer: Sasol) and 13 parts by mass (as solid content) of a binder (manufacturer: Nissan Chemical Industries, Ltd., Product name: AS200) were prepared as a slurry in water at a concentration of 200 g/liter.

Step 3-2: A ceramic base (manufacturer: NGK Insulators, Ltd., cell shape: quadrilateral/4 mil/400 cells) was coated with the slurry obtained in step 3-1.

Step 3-3: The ceramic base obtained in step 3-2 was fired for 2 hours at 500° C. in an electric furnace, and the obtained catalyst was used as the second-stage catalyst for Example 1.

First-stage catalysts were prepared for Examples 2 to 5 and Comparative Examples 1 to 5 by the same process as Example 1, except for the following points. The Cu-supporting zeolite of Example 1 was used as the second-stage catalyst.

Example 2

The heat treatment temperature of the powder of the mixture of alumina, ceria, zirconia and yttria was 800° C.

Example 3

The heat treatment temperature of the powder of the mixture of alumina, ceria, zirconia and yttria was 950° C.

Examples 4 and 5

The composition of the powder of the mixture of alumina, ceria, zirconia and yttria was changed.

Comparative Example 1

Alumina powder (manufacturer: Sasol) was used instead of the powder of the mixture of alumina, ceria, zirconia and yttria. (Comparative Example 1, Comparative Example 3)

Comparative Example 2

Alumina powder (manufacturer: Sasol) was used instead of the powder of the mixture of alumina, ceria, zirconia and yttria, and ceria-zirconia powder (Ce:Zr=50 wt %:50 wt %) was mixed in a mass ratio of 2:1.

Comparative Example 4

In <Production of powder of alumina, ceria, zirconia and yttria mixture> above, 0.5 g of the dispersing agent polyethyleneimine (manufacturer: Wako Pure Chemical Industries, Ltd.) was used per 1 g of the powder of the mixture of alumina, ceria, zirconia and yttria.

Comparative Example 5

In <Production of powder of alumina, ceria, zirconia and yttria mixture>, the spraying speed was increased 5-fold and the heat treatment temperature of the powder of the mixture of alumina, ceria, zirconia and yttria was 950° C.

The first-stage catalyst used was the Cu-supporting mixture of alumina, ceria, zirconia and yttria of Example 1 ($Al_2O_3$:$CeO_2$:$ZrO_2$:$Y_2O_3$=65:13:20:2 wt %), and the second-stage catalysts for Examples 6 to 11 and Comparative Examples 6 and 7 were prepared by the same procedure as Example 1, except for the following points.

Example 6

Fe-supporting zeolite powder was used instead of Cu-supporting zeolite powder.

Example 7

Of the Cu-supporting zeolite powder, 40 parts by mass was replaced with Fe-supporting titania powder.

Example 8

Of the Cu-supporting zeolite powder, 40 parts by mass was replaced with Fe-supporting TiOx powder produced by coprecipitation using Fe and Ti.

Specifically, the coprecipitation process using Fe and Ti was accomplished by dissolving 49.5 g of $Ti(SO_4)_2 \cdot 5H_2O$ and 60.6 g of $Fe(NO_3)_3 \cdot 9H_2O$ in water, adjusting the solution upward to 1 L, and spray atomizing the solution while adjusting the pH to 10 or below in 0.5 M $NH_3$ water, to synthesize an oxide which was filtered and rinsed and fired at 600° C.

Example 9

Fe-supporting zeolite was used instead of Cu-supporting zeolite powder, and 40 parts by mass of the Fe-supporting zeolite was replaced with Cu-supporting zirconia powder.

Example 10

Fe-supporting zeolite was used instead of Cu-supporting zeolite powder, and 40 parts by mass of the Fe-supporting zeolite was replaced with Co-supporting zirconia powder.

Example 11

Fe-supporting zeolite was used instead of Cu-supporting zeolite powder, and 40 parts by mass of the Fe-supporting zeolite was replaced with Cu-supporting alumina powder.

Comparative Example 6

The same catalyst system was used as in Example 8.

Comparative Example 7

Of the Cu-zeolite powder, 40 parts by mass was replaced with Ag-supporting alumina powder.

First-stage catalysts were prepared for Examples 12 to 17 and Comparative Examples 8 to 11 by the same process as Example 1, except for the following points. For the second-stage catalyst, the Cu-supporting zeolite of Example 1 was used as the second-stage catalyst, except that the second-stage catalyst of Example 8 was used for Example 17.

Examples 12 to 17

In step 2-1 of <Production of first-stage catalyst>, 145 parts by mass of the powder of the mixture of alumina, ceria, zirconia and yttria supporting Au and Cu alloy particles obtained in <Preparation of powder of mixture of alumina, ceria, zirconia and yttria supporting Au/Cu alloy particles> was used instead of 137 parts by mass of the powder of a mixture of alumina, ceria, zirconia and yttria, and a slurry was formed in water to 158 g/liter. Also, step 2-3 was not carried out.

Comparative Example 8

In step 2-1 of <Production of first-stage catalyst>, alumina powder (manufacturer: Sasol) was used instead of the powder of the mixture of alumina, ceria, zirconia and yttria.

Comparative Example 9

Alumina powder (manufacturer: Sasol) was used instead of the powder of the mixture of alumina, ceria, zirconia and yttria, in the first-stage catalyst of Example 12.

Comparative Examples 10 and 11

Same as for Example 12.

(Catalyst Evaluation)

The first-stage catalyst and second-stage catalyst were situated downstream from the exhaust manifold of a 2400 cc cylinder capacity engine, and evaluation was performed using an FT-IR $NH_3$ meter and another component analysis meter (manufacturer: Horiba, Ltd., Model No. 9500D), under conditions with an engine rotational speed of 2000 rpm, a torque of 58 Nm, an injection gas rate of 16 (g/s), a first-stage catalyst temperature of 580° C. and a second-stage catalyst temperature of 400° C.

The NOx purification rate was calculated by the formula.

$$(\text{Engine NOx output} - \text{second-stage catalyst NOx output})/(\text{engine NOx output}) \quad \text{formula (B)}$$

After the catalyst temperature stabilized, fuel cutting was carried out for 5 seconds as pretreatment, air was injected for initialization and the control was commenced. The purification rate during 10 minutes was determined by formula (B) above.

(Exhaust gas controlling method) The controlling method used for the exhaust gas first-stage catalyst was one of the following.

Control 1: The $A/F_1$ ratio was set to 14.55, and steps 1-1 to 1-5 were used.

Control 2: Same as control 1, except that in step 1-3, the mean A/F of formula (A) was not compared with 14.4, and steps 1-1 to 1-5 were used with the mean A/F constantly >14.4 according to (A).

However, this method increases the enrichment frequency and results in poor fuel efficiency and increased HC emission.

Enrichment control 1: The A/F ratio for the first-stage catalyst was controlled to 14.40 without using the controlling method relating to the invention.

The A/F ratio for the exhaust gas second-stage catalyst was at lean condition of 20 to 27, created by taking in air upstream from the second-stage catalyst.

Table 1 below lists the first-stage catalyst type, the powder composition, the CZ diameter in the powder of the mixture of alumina, ceria, zirconia and yttria, the controlling method for the first-stage catalyst and the type and composition of the second-stage catalyst.

TABLE 1

| | First-stage catalyst | CZ diameter (nm) | First-stage control method | Second-stage catalyst |
|---|---|---|---|---|
| Example 1 | Cu/alumina, ceria, zirconia and yttria mixture | 5 | Control 1 | Cu/zeolite |
| Example 2 | ($Al_2O_3$:$CeO_2$:$ZrO_2$:$Y_2O_3$ = 65:13:20:2) | 7 | | |
| Example 3 | | 10 | | |
| Example 4 | Cu/alumina, ceria, zirconia and yttria mixture ($Al_2O_3$:$CeO_2$:$ZrO_2$:$Y_2O_3$ = 52:28:18:2) | 9 | | |
| Example 5 | Cu/alumina, ceria, zirconia and yttria mixture ($Al_2O_3$:$CeO_2$:$ZrO_2$:$Y_2O_3$ = 44:24:30:2) | 8 | | |
| Example 6 | Cu/alumina, ceria, zirconia and yttria mixture | 5 | | Fe/zeolite |
| Example 7 | ($Al_2O_3$:$CeO_2$:$ZrO_2$:$Y_2O_3$ = 65:13:20:2) | 5 | | Cu/zeolite + Fe/$TiO_2$ (=60:40) |
| Example 8 | | 5 | | Cu/zeolite + Fe/TiOx (=60:40) |
| Example 9 | | 5 | | Fe/zeolite + Cu/zirconia (=60:40) |
| Example 10 | | 5 | | Fe/zeolite + Co/zirconia (=60:40) |
| Example 11 | | 5 | | Fe/zeolite + Cu/alumina (=60:40) |
| Comp. Ex. 1 | Cu/alumina | — | Enrichment control 1 | Cu/zeolite |

TABLE 1-continued

|  | First-stage catalyst | CZ diameter (nm) | First-stage control method | Second-stage catalyst |
|---|---|---|---|---|
| Comp. Ex. 2 | Cu/(alumina + CZ) (=2:1) (Ce:Zr = 50:50) | 20 | Control 1 | |
| Comp. Ex. 3 | Cu/alumina | — | Control 2 | |
| Comp. Ex. 4 | Cu/alumina, ceria, zirconia and yttria mixture | 3 | Control 1 | |
| Comp. Ex. 5 | ($Al_2O_3$:$CeO_2$:$ZrO_2$:$Y_2O_3$ = 65:13:20:2) | 13 | | |
| Comp. Ex. 6 | | 5 | Enrichment control 1 | Cu/zeolite + Fe/TiOx (=60:40) |
| Comp. Ex. 7 | | 5 | Control 1 | Cu/zeolite + Ag/alumina (-=60:40) |

The compositions are wt % ratios, and the $Al_2O_3$:$CeO_2$:$ZrO_2$:$Y_2O_3$ ratios are oxide-based values.
In the table, the "+" symbol is used as follows: For example, Cu/zeolite + Fe/$TiO_2$ (=60:40) represents Cu/zeolite:Fe/$TiO_2$ = 60:40.

Figure 9:
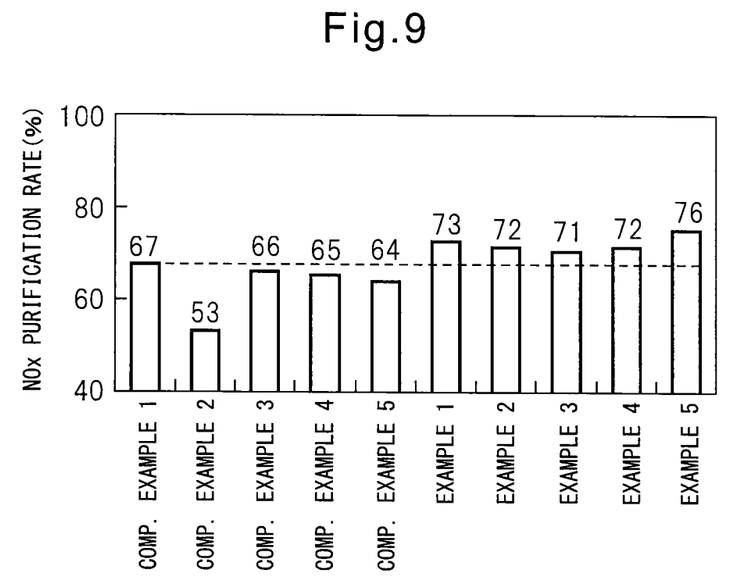
FIG. 9 is a graph showing the NOx purification rates (%) for Examples 1 to 5 and Comparative Examples 1 to 5.
Figure 10:
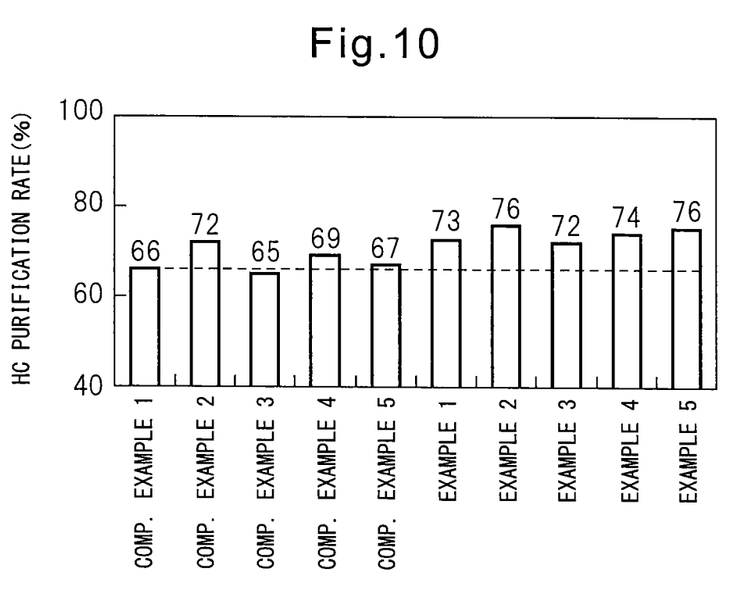
FIG. 10 is a graph showing the HC purification rates (%) for Examples 1 to 5 and Comparative Examples 1 to 5.

The NOx purification rates for the catalysts of Examples 1 to 5 and Comparative Examples 1 to 5 are shown in FIG. 9, and the HC purification rates are shown in FIG. 10. With the catalysts of Examples 1 to 5, it is possible to effectively purify NOx and increase the HC purification rate.

Figure 11:
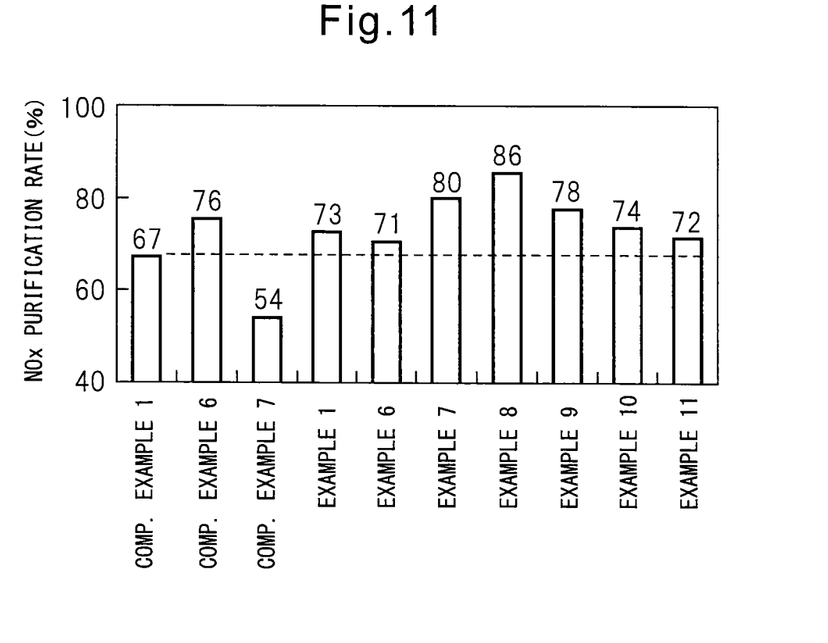
FIG. 11 is a graph showing the NOx purification rates (%) for Examples 1 and 6 to 11 and Comparative Examples 1, 6 and 7.
Figure 12:
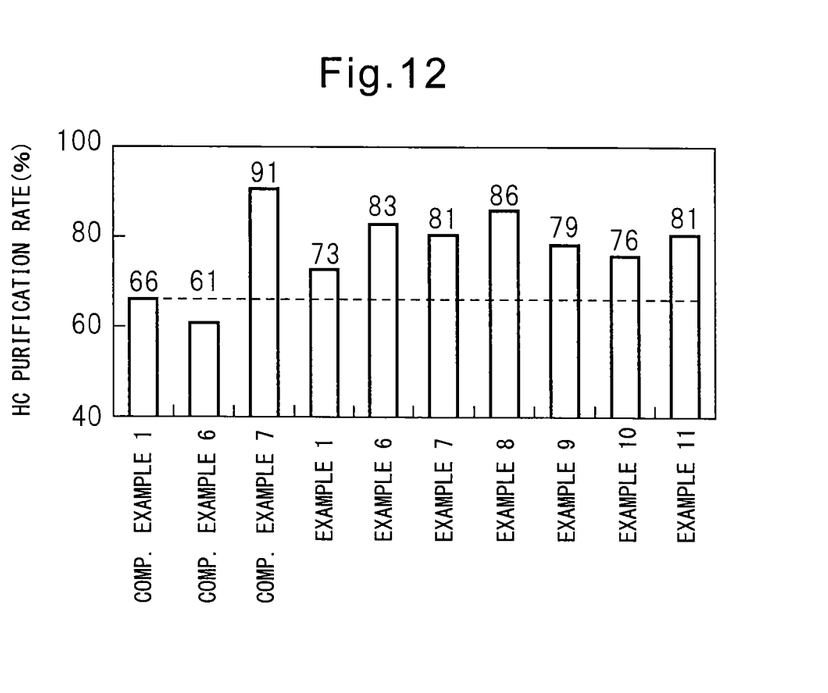
FIG. 12 is a graph showing the HC purification rates (%) for Examples 1 and 6 to 11 and Comparative Examples 1, 6 and 7.

The NOx purification rates for the catalysts of Examples 6 to 11 and Comparative Examples 1 and 6 to 7 are shown in FIG. 11, and the HC purification rates are shown in FIG. 12. In Examples 6 to 11, drastic increase was exhibited for both the NOx purification rate and HC purification rate.

When Comparative Example 6 is compared with Example 8, it is seen that while in Comparative Example 6 the HC purification rate was reduced to 61% because of (enrichment control 1), in Example 8 the enrichment control time was short because of (control 1), and therefore the HC purification rate increased to 86%.

Also, when Comparative Example 7 is compared with Example 11, it is seen that in Comparative Example 7 the NOx purification rate was reduced to 54%, presumably due to promoting oxidation reaction of $NH_3+O_2 \rightarrow NOx$ by Ag which has high oxidation power.

While it is not our desire to be constrained by theory, it is possible to consider that it is a necessary condition for the catalyst added to the second-stage catalyst to inhibit oxidation of $NH_3$ to NOx.

(Catalyst Evaluation 2)

For Examples 12 to 17 and Comparative Examples 8 to 11, the conditions described above under (Catalyst evaluation) were used, with A/$F_2$ ratios of 14.4, 14.3, 14.2, 14.0, 13.8, 14.4 and 14.5 in control 1 for Examples 12 to 17 and Comparative Example 11 and A/F ratios of 14.4, 14.6 and 14.55 in enrichment control 1 for Comparative Examples 8 to 10, and the NOx purification rates, HC purification rates, CO purification rates and $N_2O$ production amounts (relative ratios) were measured.

Table 2 below lists the first-stage catalyst type, the powder composition, the CZ diameter in the powder of the mixture of alumina, ceria, zirconia and yttria, the controlling method for the first-stage catalyst and the type and composition of the second-stage catalyst, the NOx, HC and CO purification rates (%) and the $N_2O$ production amount (relative ratio).

TABLE 2

|  | First-stage catalyst | CZ diameter (nm) | First-stage catalyst control method | A/$F_2$ value | Second-stage catalyst | NOx purification rate (%) | HC purification rate (%) | CO purification rate (%) | $N_2O$ yield (relative to Comp. Ex. 10) |
|---|---|---|---|---|---|---|---|---|---|
| Example 12 | Au—Cu alloy/alumina, ceria, zirconia and yttria mixture ($Al_2O_3$:$CeO_2$:$ZrO_2$:$Y_2O_3$ = 65:13:20:2) | 5 | Control 1 | 14.4 | Cu/zeolite | 98.5 | 88 | 93 | 0.272 |
| Example 13 | | | | 14.3 | | 98 | 88 | 93 | 0.12 |
| Example 14 | | | | 14.2 | | 97 | 87 | 92 | 0.312 |
| Example 15 | | | | 14.0 | | 98 | 88 | 93 | 0.16 |
| Example 16 | | | | 13.8 | | 97 | 89 | 91 | 0.28 |
| Example 17 | | | | 14.4 | Cu/zeolite + Fe—TiOx | 96 | 88 | 99 | 0.08 |
| Comp. Ex. 8 | Cu/alumina | | Enrichment control 1 | 14.4 | Cu/zeolite | 67 | 66 | 94 | 1.4 |
| Comp. Ex. 9 | Au—Cu alloy/alumina | | | 14.6 | | 89 | 70 | 95 | 1.15 |
| Comp. Ex. 10 | Au—Cu alloy/alumina, ceria, zirconia and yttria mixture ($Al_2O_3$:$CeO_2$:$ZrO_2$:$Y_2O_3$ = 65:13:20:2) | 5 | | 14.55 | | 95 | 85 | 99 | 1 |
| Comp. Ex. 11 | | | Control 1 | 14.5 | | 95 | 88 | 95 | 0.88 |

The compositions are wt % ratios, and the ($Al_2O_3$:$CeO_2$:$ZrO_2$:$Y_2O_3$) ratios are oxide-based values.
In the table, the "+" symbol is used as follows: For example, Cu/zeolite + Fe/$TiO_2$ (=60:40) represents Cu/zeolite:Fe/$TiO_2$ = 60:40.

($NH_3$ Generation Test)

Using the first-stage catalysts of Example 12 and Comparative Example 8, under the conditions of enrichment control 1, the $NH_3$ production concentration was measured with an A/F ratio of 14.4, 14.5 and 14.55 for the catalyst of Example 12 and an A/F ratio of 14.4 and 14.5 for the catalyst of Comparative Example 8.

Figure 13:
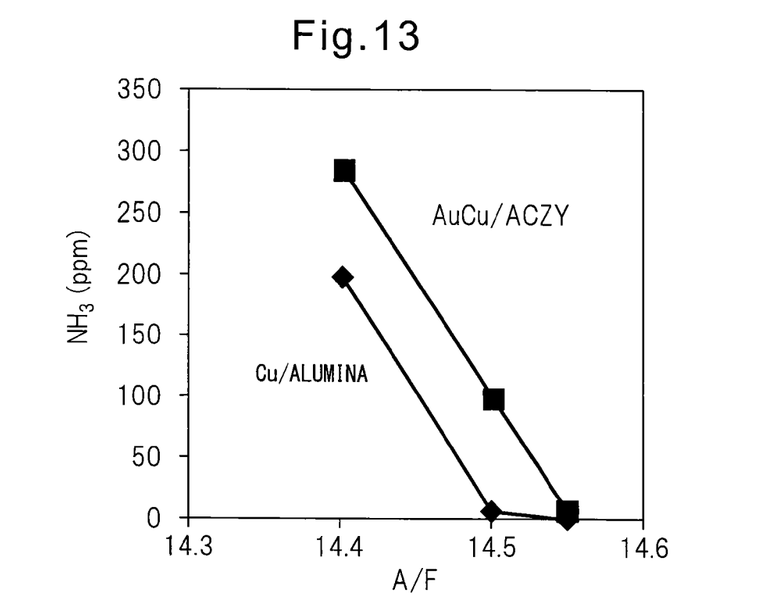
FIG. 13 is a graph plotting measurement results for generation of $NH_3$ (ppm) with respect to A/F value, for the catalysts of Example 12 and Comparative Example 8.

As a result, the catalyst of Example 12 exhibited higher $NH_3$ production power than the catalyst of Comparative Example 8 for all of the A/F ratio values (FIG. 13).

Figure 14:
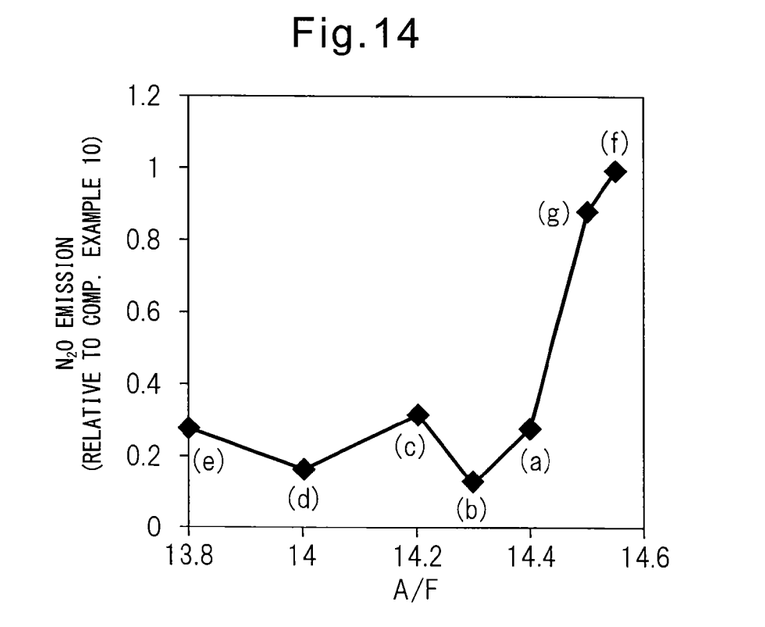
FIG. 14 is a graph plotting the $N_2O$ emissions for (a) Example 12, (b) Example 13, (c) Example 14, (d) Example 15, (e) Example 16, (f) Comparative Example 10 and (g) Comparative Example 11 with respect to A/F value (A/$F_2$ value for Examples 12 to 16 and Comparative Example 11), with the $N_2O$ emission of Comparative Example 10 as 1.

It was also confirmed that, after passing through the second-stage catalyst, changing the $AF_2$ value as in Examples 12 to 16 produced an effect in which NOx was purified at any value, while high $N_2O$ emission was inhibited when $AF_2$ was 14.4 or lower (FIG. 14).

When Examples 12 to 17 and Comparative Examples 8 to 11 were compared, it was found that lowering the air/fuel ratio in the enriched state using a catalyst according to one mode of the invention could achieve a reduction in $N_2O$ emission.

Also, intermittently introducing an enriched state generates less HC and CO than a conventional system that constantly controls the enriched state, and therefore the volume of the catalyst for their purification can be reduced and fuel efficiency can therefore be increased.

If the $NH_3$ generated during enrichment with the first-stage catalyst is held at the second-stage catalyst as described above, activating oxidation of $N_2O$ and $NO_x$, this not only allows selective oxidation to be accomplished, but also increases the purification efficiency per fuel volume and eliminates the need for $NH_3$ oxidizing treatment.

Furthermore, the selective oxidation allows the second-stage catalyst to purify NOx and the like even under lean conditions, eliminating the need for precise control of the air injection volume, and can therefore simplify the system.

INDUSTRIAL APPLICABILITY

Thus, the base metal oxidation catalyst and controlling method relating to the invention can purify NOx at high efficiency, and a catalyst system for exhaust gas purification with high fuel efficiency can be provided. The uses of an oxidation catalyst relating to the invention, therefore, are not limited to an exhaust gas purification catalyst, and the catalyst may be utilized for various purposes in a wide range of fields.

What is claimed is:

1. A catalyst system for exhaust gas purification comprising: an electronic control unit (ECU); a first-stage metal catalyst located at an upstream end; and a second-stage base metal catalyst located at a downstream end, wherein the first-stage metal catalyst has Cu metal and/or Cu oxide supported on one or more oxide supports selected from the group consisting of alumina, ceria, zirconia, yttria and titania, wherein the crystallite diameter for ceria-zirconia of the oxide supports is 4 nm-12 nm, and wherein when the volume of NOx in the exhaust gas has become equal to or exceeds an NOx criteria, the ECU switches the state of the exhaust gas from slightly enriched of $14.45 \leq A/F_1 \leq -14.59$ to enriched of $A/F_2 \leq 14.40$.

2. A catalyst system for exhaust gas purification according to claim 1, wherein the ECU controls the injection of air between the first-stage metal catalyst and second-stage base metal catalyst, and controls the exhaust gas to a condition more lean than a theoretical air/fuel ratio of A/F=14.6 at the second-stage base metal catalyst.

3. A catalyst system for exhaust gas purification according to claim 2, wherein the oxide support of the first-stage metal catalyst is fine particles of a mixture of alumina, ceria, zirconia and yttria.

4. A catalyst system for exhaust gas purification according to claim 3, wherein the first-stage metal catalyst has an alloy of Au and Cu supported in place of Cu metal and/or Cu oxide.

5. A catalyst system for exhaust gas purification according to claim 4, wherein the second-stage base metal catalyst has one or more metals and/or metal oxides selected from the group consisting of Cu, Fe, Co and Ce supported on one or more oxide supports selected from the group consisting of alumina, zirconia, titania and zeolite.

6. A catalyst system for exhaust gas purification according to claim 5, wherein the second-stage base metal catalyst has Cu and/or Fe metal and/or metal oxide supported on an oxide support containing zeolite.

7. A catalyst system for exhaust gas purification according to claim 3, wherein the second-stage base metal catalyst has one or more metals and/or metal oxides selected from the group consisting of Cu, Fe, Co and Ce supported on one or more oxide supports selected from the group consisting of alumina, zirconia, titania and zeolite.

8. A catalyst system for exhaust gas purification according to claim 7, wherein the second-stage base metal catalyst has Cu and/or Fe metal and/or metal oxide supported on an oxide support containing zeolite.

9. A catalyst system for exhaust gas purification according to claim 2, wherein the second-stage base metal catalyst has one or more metals and/or metal oxides selected from the group consisting of Cu, Fe, Co and Ce supported on one or more oxide supports selected from the group consisting of alumina, zirconia, titania and zeolite.

10. A catalyst system for exhaust gas purification according to claim 9, wherein the second-stage base metal catalyst has Cu and/or Fe metal and/or metal oxide supported on an oxide support containing zeolite.

11. A catalyst system for exhaust gas purification according to claim 1, wherein the second-stage base metal catalyst has one or more metals and/or metal oxides selected from the group consisting of Cu, Fe, Co and Ce supported on one or more oxide supports selected from the group consisting of alumina, zirconia, titania and zeolite.

12. A catalyst system for exhaust gas purification according to claim 11, wherein the second-stage base metal catalyst has Cu and/or Fe metal and/or metal oxide supported on an oxide support containing zeolite.

* * * * *